United States Patent
Kanebako et al.

(10) Patent No.: US 7,198,463 B2
(45) Date of Patent: Apr. 3, 2007

(54) ROTATING BLADE BODY AND ROTARY MACHINE USING ROTATING BLADE BODY

(75) Inventors: Atsuhiko Kanebako, Hyogo-ken (JP); Yasuhiro Ojiro, Hyogo-ken (JP); Kouichi Akagi, Hyogo-ken (JP); Keita Takamura, Hyogo-ken (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 135 days.

(21) Appl. No.: 11/020,182

(22) Filed: Dec. 27, 2004

(65) Prior Publication Data

US 2005/0207892 A1 Sep. 22, 2005

(30) Foreign Application Priority Data

Feb. 25, 2004 (JP) .............................. 2004-049589
Jul. 16, 2004 (JP) .............................. 2004-209462

(51) Int. Cl.
*F01D 5/02* (2006.01)
*F01D 5/10* (2006.01)
*F01D 11/00* (2006.01)

(52) U.S. Cl. .............. 415/175; 416/219 R; 416/220 R; 416/500

(58) Field of Classification Search .............. 416/97 R, 416/219 R, 220 R, 221, 500, 174; 415/115, 415/175
See application file for complete search history.

(56) References Cited

U.S. PATENT DOCUMENTS

| 3,479,009 A | | 11/1969 | Bean | |
|---|---|---|---|---|
| 4,021,138 A | * | 5/1977 | Scalzo et al. | 416/95 |
| 4,478,554 A | * | 10/1984 | Surdi | 416/221 |
| 5,318,405 A | * | 6/1994 | Meade et al. | 416/220 R |
| 5,584,659 A | * | 12/1996 | Schmidt | 416/221 |
| 6,447,253 B2 | * | 9/2002 | Tempere | 416/221 |
| 6,575,704 B1 | * | 6/2003 | Tiemann | 416/219 R |

FOREIGN PATENT DOCUMENTS

| CH | 655547 | 4/1986 |
|---|---|---|
| DE | 49078 | 7/1966 |
| DE | 4430636 | 3/1996 |
| JP | 4-119392 | 10/1992 |
| JP | 2002-332802 | 11/2002 |
| JP | 2003-314369 | 11/2003 |

* cited by examiner

OTHER PUBLICATIONS

German Office Action dated Feb. 27, 2006.

*Primary Examiner*—Igor Kershteyn
(74) *Attorney, Agent, or Firm*—Westerman, Hattori, Daniels & Adrian, LLP.

(57) ABSTRACT

Such a rotating blade body is supplied as can prevent not only local wear and deformation but also inadvertent vibration and can maintain cooling efficiency. A rotating blade body consists of a rotor disc 2 and rotating blades 1 which are assembled so as to extend from the outer circumference of the rotor disc 2 in a radial pattern, wherein blade root portions 10 of the rotating blades 1 are engaged into blade grooves 20 which are formed along a direction of a rotating shaft on an edge of the outer circumference of the rotor disc 2. Circulation spaces 25 for the cooling air are formed along the direction of a rotating shaft between the bottom-end portions 10a of the blade root portions 10 and the bottom portions 20a of the blade grooves 20. Pushing-up members 3 which push up the rotating blades 1 outward in a radial direction are inserted into the circulation spaces 25, maintaining circulation of the cooling air.

5 Claims, 14 Drawing Sheets

ROTATING BLADE BODY AND ROTARY MACHINE USING ROTATING BLADE BODY

The present invention is based on the Japanese Patent Application No. 2004-049589 applied on Feb. 25, 2004 and the Japanese Patent Application No. 2004-209462 applied on Jul. 16, 2004.

BACKGROUND OF THE INVENTION

1. Field of the Invention

The present invention relates to a rotating blade body, which is mounted to a rotary machine such as a turbine part of a gas turbine, steam turbine, jet engine and the like or an air compressor of a gas turbine and jet engine and rotates with a main shaft in an integrated manner, and relates to a rotary machine to which a rotating blade body is installed.

2. Description of the Prior Art

Generally, in a rotary machine such as a turbine part of a gas turbine and the like and an air compressor, a main shaft is installed inside a casing constructing an outer shape so as to achieve axial rotation. Rotor discs are installed to this main shaft in a plurality number of stagesaxially, and a plurality number of pieces of rotating blades are extending from the outer circumference of each of rotor discs in a radial pattern. These rotor discs and rotating blades constitute a rotating blade body, which rotates together with the main shaft in an integrated manner. Additionally, stationary vanes are installed to the casing along the main shaft so as to be arranged in a manner of alternating with the rotating blades.

In a case of a gas turbine, in a turbine part constructed as described above, high temperature and high pressure combustion gas is supplied from a combustor, and by having this combustion gas flow by way of rotating blades and stationary vanes alternately, the main shaft is rotary driven together with rotating blades, namely with a rotating blade body. Then, when a generator is connected to an edge of the main shaft, turning force of the main shaft is utilized as a source of electric power generation. On the contrary, when an engine nozzle for exhaust of combustion gas is installed at an end of the turbine part, turning force of the main shaft is utilized as a jet engine. In a case of a steam turbine, by having high pressure steam flow by way of rotating blades and stationary vanes alternately, the main shaft is rotary driven, and turning force of this main shaft is utilized as a source of electric power generation of a generator.

On the other hand, in an air compressor of a gas turbine, a rotating blade body rotates together with a main shaft by rotation of the main shaft. By this, the air is inhaled from the outside and supplied to a combustor, being compressed by way of rotating blades and stationary vanes alternately. Here, compressed air being introduced into a combustor is burned with fuel being supplied, resulting in high temperature and high pressure combustion gas, which is to be supplied to a turbine part of the above-mentioned gas turbine.

Here, a rotating blade body consists of a rotor disc and rotating blades that are manufactured independently and is constructed in a manner that the rotating blades are assembled to the rotor disc. To be more precise, as shown in FIG. 14 and FIG. 15, a rotating blade 1 mainly has a blade root portion 10 whose vertical section is formed in a Christmas tree, a profile portion 11 and a shroud portion (not illustrated herein).

A blade root portion 10 is a portion which is to be engaged to an after-mentioned blade groove 20 in a rotor disc 2, functioning to maintain a rotating blade against the rotor disc 2. A profile portion 11 is a portion which has a transverse section shaped in a streamline and extends by being gradually twisted while maintaining this streamlined shape, and it functions so as to make fluid such as combustion gas, high pressure steam and air flow substantially in a smooth manner. A shroud portion is a portion which has a transverse section shaped approximately in a letter "Z" and is formed on an edge of a profile portion 11, and when a rotating blade body rotates at a high speed together with a main shaft, the end face of each of shroud portions of rotating blades 1 neighboring each other comes to contact with each other, by slightly decreasing the twisting degree of the profile portion 11 due to a centrifugal force being applied, and as a result, a shroud portion functions so as to stabilize the circumferential arrangement of the rotating blades 1 as a whole.

On the other hand, on an edge of the outer circumference of a rotor disc 2, blade grooves 20 being shaped approximately the same as longitudinal section of blade root portions 10 of the rotating blades 1 are formed at regular intervals in a circumferential direction along a rotating shaft. Into each of these blade grooves 20, blade root portions 10 of the rotating blades 1 are inserted from a direction of the rotating shaft and engaged. In this way, the rotating blades 1 are assembled to the rotor disc 2 so as to obtain a rotating blade body in which a plurality number of pieces of rotating blades 1 extend from an outer circumference of the rotor disc 2 in a radial pattern.

Especially, in a case of a rotating blade body which is to be installed to a turbine part of a gas turbine and the like, due to exposure to very high temperature, only the bottom portions 20a of the blade grooves 20 of the rotor disc 2 are widened largely for the bottom-end portions 10a of the blade roots 10 of the rotating blades 1, in order to restrain an excessive increase in temperature of a rotating blade body itself caused by the aforementioned exposure. In other words, between the bottom-end portions 10a of the rotating blade roots 10 and the bottom portions 20a of the blade grooves 20, circulation spaces 25 for cooling air are formed along a direction of a rotating shaft, having the cooling air for cooling the rotating blade body circulate through these circulation spaces 25.

Also, between the blade root 10 and the blade groove 20, except in this circulation space 25, generally a slight gap of approximately 0.1 mm width exists, considering easiness of insertion and extraction, maintaining integrity of post-assembly position. Therefore, the rotating blades 1 are in such a condition as to be able to move or incline toward the rotor disc 2 slightly.

And now, during steady-state operation of a turbine part of a gas turbine and the like and an air compressor to which such a rotating blade body as described above is installed, the main shaft rotates at a high speed. Therefore, a high centrifugal force which is high enough to substantially neglect gravity of empty weight acts on the rotating blades 1 that rotate at a high speed together with the main shaft. As a result, the rotating blades 1 are bound so as to always come up, facing outward in a radial direction against the rotor disc 2. Consequently, movement or inclination of the rotating blades 1 toward the rotor disc 2 does not occur, but each of the rotating blades 1 is secured in a predetermined position, being well-balanced as a whole of a rotating blade body.

However, at a time of start-up of operation or at a time of shutdown, or during a preliminary operation, because the main shaft rotates at a low speed, the rotating blades 1 which rotate together with the main shaft do not have so high centrifugal force act on them. Therefore, the rotating blades 1 being in progress of rotation move inward in a radial direction (downward in a vertical direction) of the rotor disc 2 by action of the gravity of empty weight when the rotating blades 1 are located on the upper side in a direction perpendicular to the rotating shaft. On the contrary, when the rotating blades 1 are located on the lower side in a direction perpendicular to the rotating shaft, the rotating blades 1 are momentarily placed in a condition that they have moved outward in a radial direction (downward in a vertical direction) of the rotor disc 2. In a process of making transition to these conditions alternately, the rotating blades 1 come to incline repeatedly toward the rotor disc 2 in a circumferential direction due to an action of moment of the gravity of empty weight.

Then, because local impact of blade roots 10 occurs repeatedly in blade grooves 20 as a result of these repeating movement and inclination of the rotating blades 1, local wear and deformation are caused in the blade grooves 20 and at the blade roots 10. In addition, because the position of the center of gravity of the rotating blade body itself varies repeatedly so as to cause unbalancing to the rotating blade body, inadvertent vibration is induced. Furthermore, when local wear and deformation make a progress excessively in the blade grooves 20 and at the blade roots 10, an amount of movement or an amount of inclination of the rotating blades 1 becomes larger at a time of start-up and the like when the main shaft rotates at a low speed, so that further unbalancing is caused to the rotating blade body, resulting in higher vibration induced by this unbalancing. Additionally, during a steady-state operation, because each of the rotating blades 1 is secured at a position drifting from the predetermined position, the position of the center of gravity of the rotating blade body itself varies, resulting in occurrence of inadvertent vibration.

In order to solve the above-mentioned problem, as a conventional technique as disclosed in the Japanese Utility Model Application Laid-Open H4-119392, a rotating blade body has leaf spring pieces being curved in a wave pattern in the direction of the rotating shaft inserted so as to be engaged into gaps between the bottom-end portions 10a of the blade root portions 10 and the bottom portions 20a of the blade grooves 20. In this rotating blade body, the rotating blades 1 are pressed up outward in a radial direction against the rotor disc 2, by receiving a snapping force from the leaf spring pieces and resisting against the gravity of empty load and a moment thereof, and as a result, are placed in a condition to be steadily secured at a same predetermined position as during steady-state operation. Therefore, during start-up operation and the like, the rotating blades 1 are restrained from moving and inclining. As a result, it is possible to prevent the blade grooves 20 and the blade roots 10 from being subject to local wear and deformation and inadvertent vibration may not occur.

However, while the above-mentioned improvement technique is effective for a rotating blade body in which gaps between the bottom-end portions 10a of the blade roots 10 and the bottom portions 20a of the blade grooves 20 are not so large, such as a rotating blade body for an air compressor of a gas turbine, for example, which normally does not require a circulation space 25 for the cooling air, on the contrary, it is not necessarily effective for a rotating blade body for a turbine part of a gas turbine which requires securing of a circulation space 25.

First, it is because when the gaps between the bottom-end portions 10a of the blade roots 10 and the bottom portions 20a of the blade grooves 20 are larger, the degree of curving in a wave pattern of the leaf spring pieces is restricted substantially, which deteriorates the snapping force contributing to pushing up of the rotating blades 1. As a result, the rotating blades 1 are not secured in a predetermined position against the rotor disc 2 sufficiently on a steady basis, causing movement and inclination of the rotating blades 1 substantially. As a result, inadvertent vibration occurs with local wear and deformation. Secondly, it is because circulation of the cooling air inside the circulation space 25 is disturbed widely by the leaf spring pieces and as a result, cooling efficiency of a rotating blade body is deteriorated.

SUMMARY OF THE INVENTION

It is an object of the present invention to provide a rotating blade body which can prevent local wear and deformation as well as inadvertent vibration at the same time and can maintain cooling efficiency, in addition, and to provide a rotary machine having this rotating blade body.

In order to achieve the above-mentioned object, in accordance with a preferred embodiment of the present invention, there is provided a rotating blade body comprising a rotor disc and rotating blades which are assembled so as to extend from outer circumference of this rotor disc in a radial pattern and having blade root portions of the rotating blades engaged to blade grooves being formed along the direction of a rotating shaft on an edge portion of outer circumference of the rotor disc;

wherein, circulation spaces for cooling air are formed along the direction of a rotating shaft between the bottom-end portions of blade roots of the rotating blades and the bottom portions of blade grooves of the rotor disc; and into these circulation spaces are engaged pushing-up members which push up the rotating blades outward in a radial direction, maintaining circulation of the cooling air.

Consequently, by receiving pushing-up force from the pushing-up members, the rotating blades are pushed up outward in a radial direction against the rotor disc, resisting gravity of empty load and moment thereof, and are constantly secured at a predetermined position in a same manner as during steady-state operation. Therefore, during start-up operation and the like when the main shaft rotates at a low speed, the rotating blades are restrained from movement and inclination. Needless to say, there is no interference for circulation of the cooling air inside the circulation spaces.

Here, in a viewpoint of sufficiently ensuring circulation of the cooling air in the circulation spaces and obtaining pushing-up force from the pushing-up members for practical purposes, it is preferable that the pushing-up members are leaf springs being curved around a rotating shaft.

Further, in order to obtain high pushing-up force effectively, it is preferable that the leaf springs have both end portions being in contact with the bottom surfaces of the bottom portions in the blade grooves of the rotor disc and the middle portions being in contact with the bottom-end portions of the blade root portions of the rotating blades.

In a further preferred embodiment of the present invention, there is provided a rotary machine comprising the rotating blade body, stationary vanes and a casing containing the rotating blade body and stationary vanes.

In a rotating blade body in accordance with a preferred embodiment of the present invention, because movement and inclination of the rotating blades are restrained even during start-up operation and the like when the main shaft rotates at a low speed, the blade grooves and the blade root portions can be prevented from being subject to local wear and deformation and inadvertent vibration can be restrained.

DESCRIPTION OF THE PREFERRED EMBODIMENTS

Figure 1:
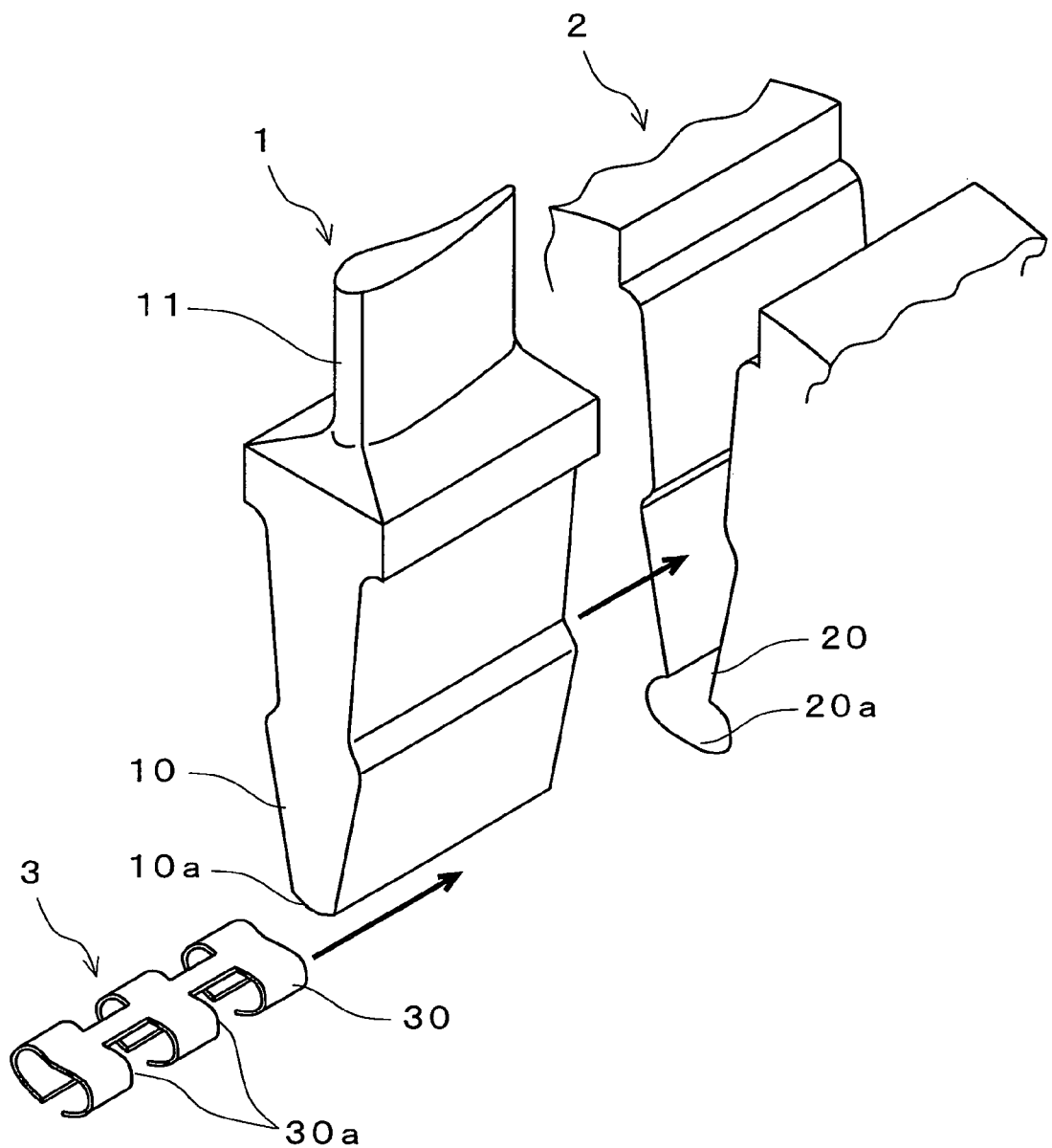
FIG. 1 is an exploded perspective view of a rotating blade body in accordance with a first embodiment of the present invention.
Figure 2:
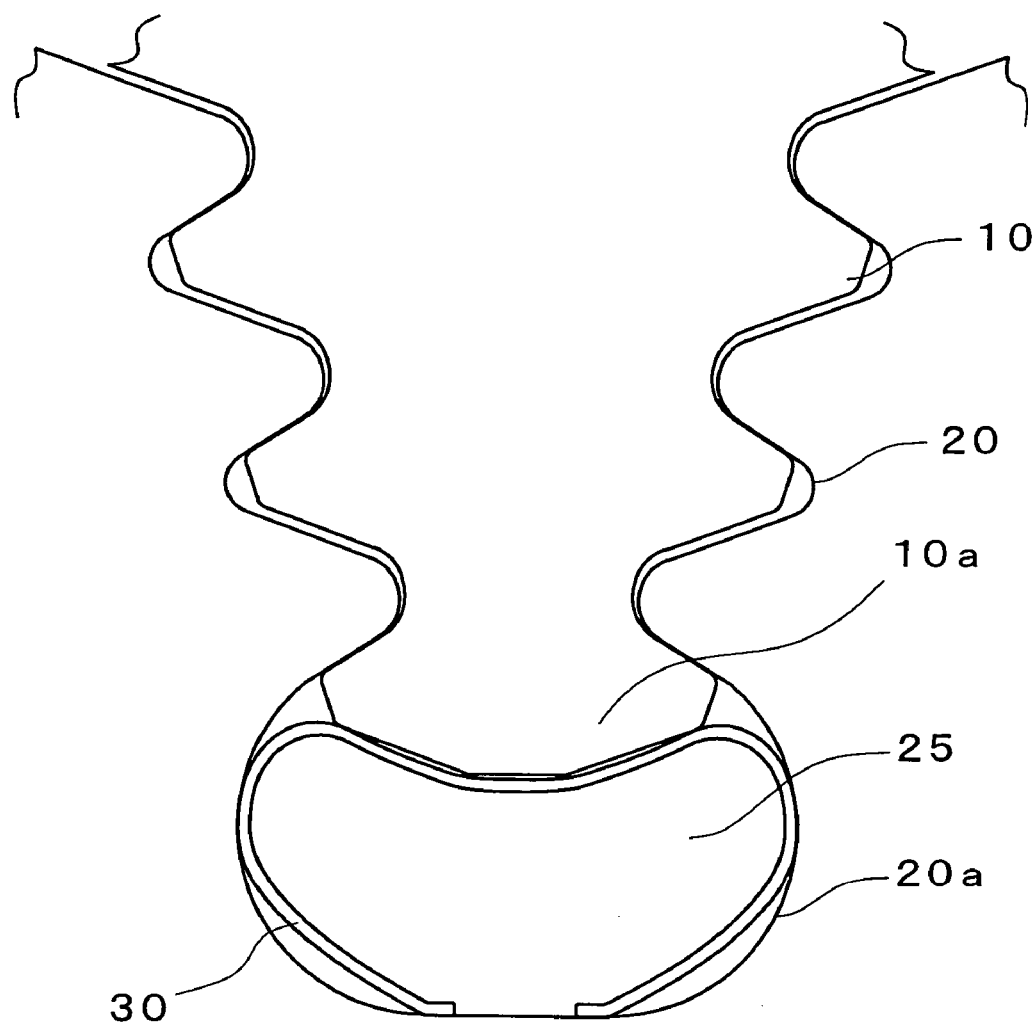
FIG. 2 is a plan view of a necessary portion of a rotating blade body viewed in a direction of a rotating shaft in accordance with a first embodiment of the present invention.
Figure 14:
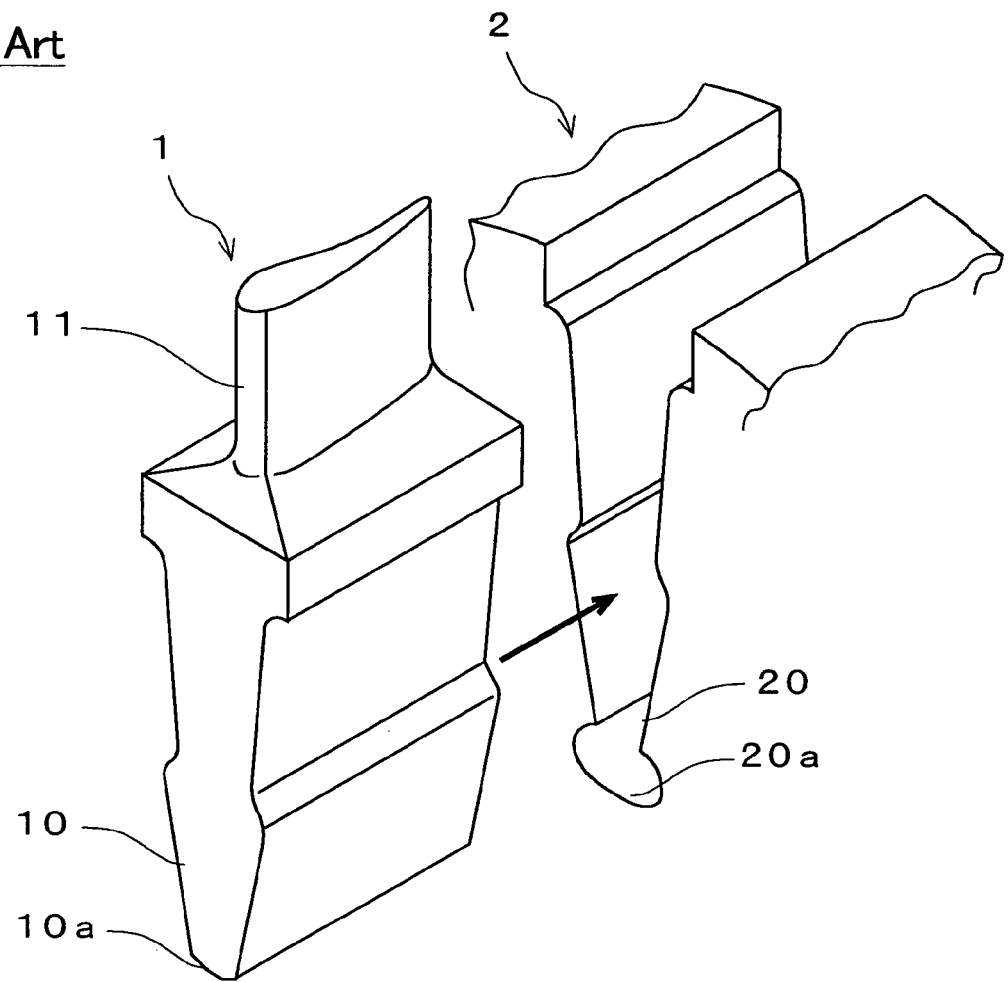
FIG. 14 is an exploded perspective view of a conventional rotating blade body.
Figure 15:
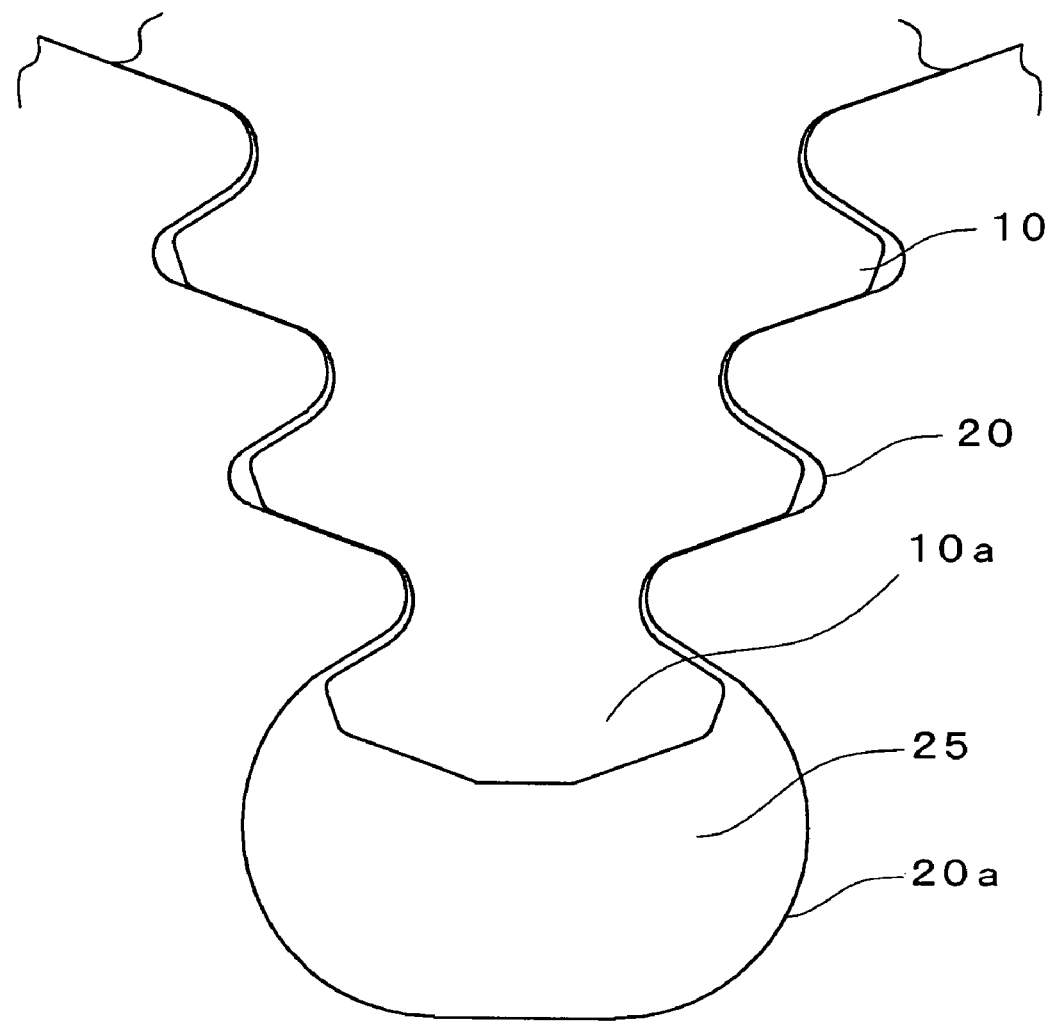
FIG. 15 is a plan view of a necessary portion of a conventional rotating blade body viewed in a direction of a rotating shaft.

Referring now to the drawings, an embodiment of the present invention will be described hereinafter. First, a rotating blade body in accordance with a first embodiment of the present invention will be described. FIG. 1 is an exploded perspective view of a rotating blade body in accordance with a first embodiment of the present invention, and FIG. 2 is a plan view of a necessary portion of the rotating blade body viewed in a direction of the rotating shaft. In these figures, same symbols will be supplied to portions which have same names as shown in FIG. 14 and FIG. 15, and overlapping description will be omitted. This will be the same for after-mentioned second through sixth embodiments of the present invention.

As shown in FIG. 1 and FIG. 2, a rotating blade body in accordance with an embodiment of the present invention consists of a rotor disc 2, rotating blades 1 and leaf springs 30 made of metal serving as pushing-up members 3, which are manufactured individually, and is constructed so as to have rotating blades 1 and leaf springs 30 mounted to a rotor disc 2.

Here, leaf springs 30 are engaged into circulation spaces 25 from the direction of the rotating shaft, and by snapping force of their own, play a role to push up the rotating blades 1 against the rotor disc 2, facing outward in a radial direction. To be more precise, leaf springs 30 used for the embodiment of the present invention are curved around the rotating shaft, being in contact with the bottom faces of the bottom portions 20a of blade grooves 20 in both edge portions in a rotation direction of a rotating shaft and rising approximately along the side surfaces thereof gradually, and are shaped so as to have the middle portions be along and in contact with the bottom-end portions 10a of the blade root portions 10. In other words, leaf springs 30 exist approximately along the outer edge of the circulation spaces 25.

As a material of a leaf spring 30 when a rotating blade body is to be installed to the turbine part of a gas turbine and rotating blades 1 are made of Inconel (a Ni—Cr group alloy), for example, and a rotor disc 2 is made of material having slightly lower hardness than the rotating blades 1, such as a combination of Ni—Cr—Mo steel, for example, stainless steel, like SUS 304 or SUS 303 in the JIS standards, is suitable. However, material of leaf springs 30 may be selected appropriately, depending on an object to which a rotating blade body is installed (a gas turbine and the like and a turbine part thereof) and on a combination of materials of the rotating blades 1 and the rotor disc 2.

Figure 3:
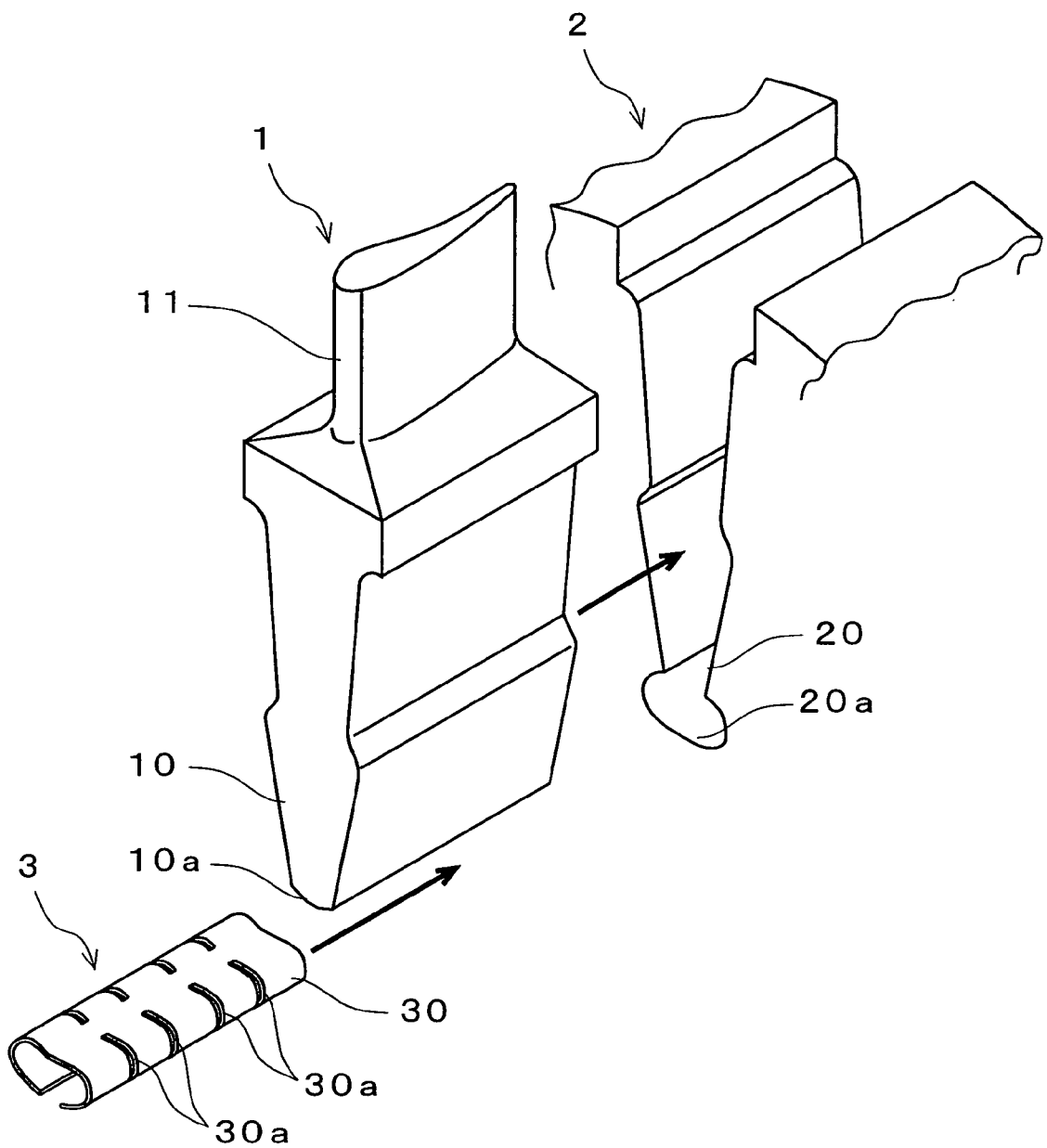
FIG. 3 is an exploded perspective view depicting an example of deformation of a pushing-up member of a rotating blade body in accordance with a first embodiment of the present invention.
Figure 4:
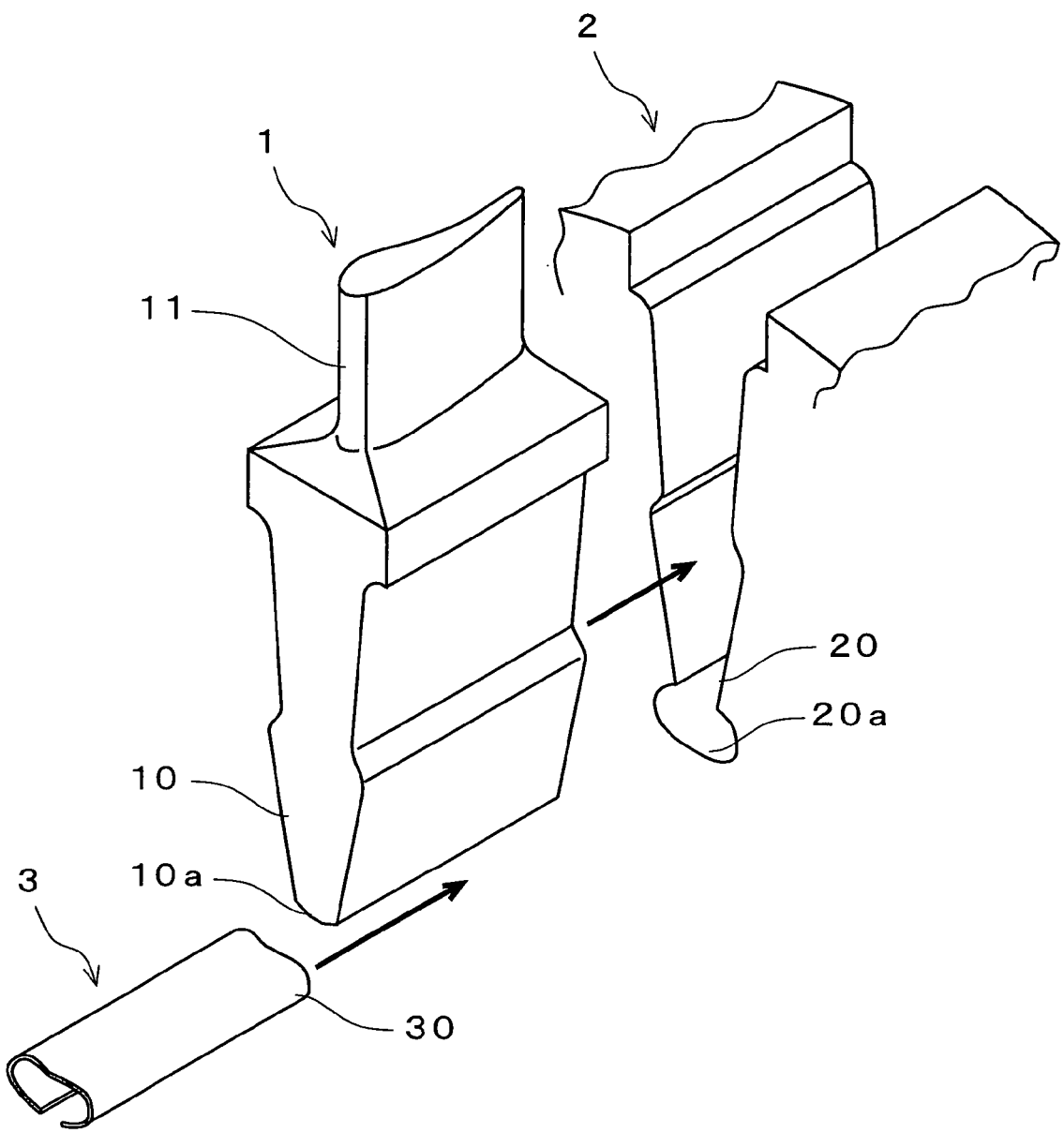
FIG. 4 is an exploded perspective view depicting another example of deformation of a pushing-up member of a rotating blade body in accordance with a first embodiment of the present invention.

Leaf springs 30 in accordance with the embodiment of the present invention have cutouts 30a (See FIG. 1.) formed symmetrically around the rotating shaft in two stages in a direction of the rotating shaft. These cutouts 30a are for making curving process easy when the leaf springs 30 are manufactured. Therefore, as shown in FIG. 3, cutouts 30a may be formed in four stages, and there is no limit for a number of stages to be formed and a shape as long as snapping force of the leaf springs 30 can be maintained high. Needless to say, as shown in FIG. 4, cutouts 30a may not be formed.

In a rotating blade body constructed as described above, rotating blades 1 receive a snapping force from the leaf springs 30 serving as pushing-up members 3 as a pushing-up force and are pushed up outward in a radial direction against the rotor disc 2, resisting the gravity of empty weight and moment thereof. As a result, the rotating blades 1 are steadily secured at a same predetermined position as during steady-state operation when the main shaft rotates at a high speed. Therefore, even during start-up operation when the main shaft rotates at a low speed, movement and inclination of the rotating blades 1 can be restrained. In consequence, local wear and deformation of the blade grooves 20 and blade roots 10 can be prevented and inadvertent vibration can also be restrained.

In addition, because leaf springs 30 are curved around the rotating shaft although these leaf springs 30 exist inside circulation spaces 25, and because existence region thereof is limited to the outer edge of the circulation spaces 25, circulation for the cooling air inside the circulation spaces 25 are sufficiently secured and circulation thereof has no interference, thereby maintaining cooling efficiency of a rotating blade body.

Figure 5:
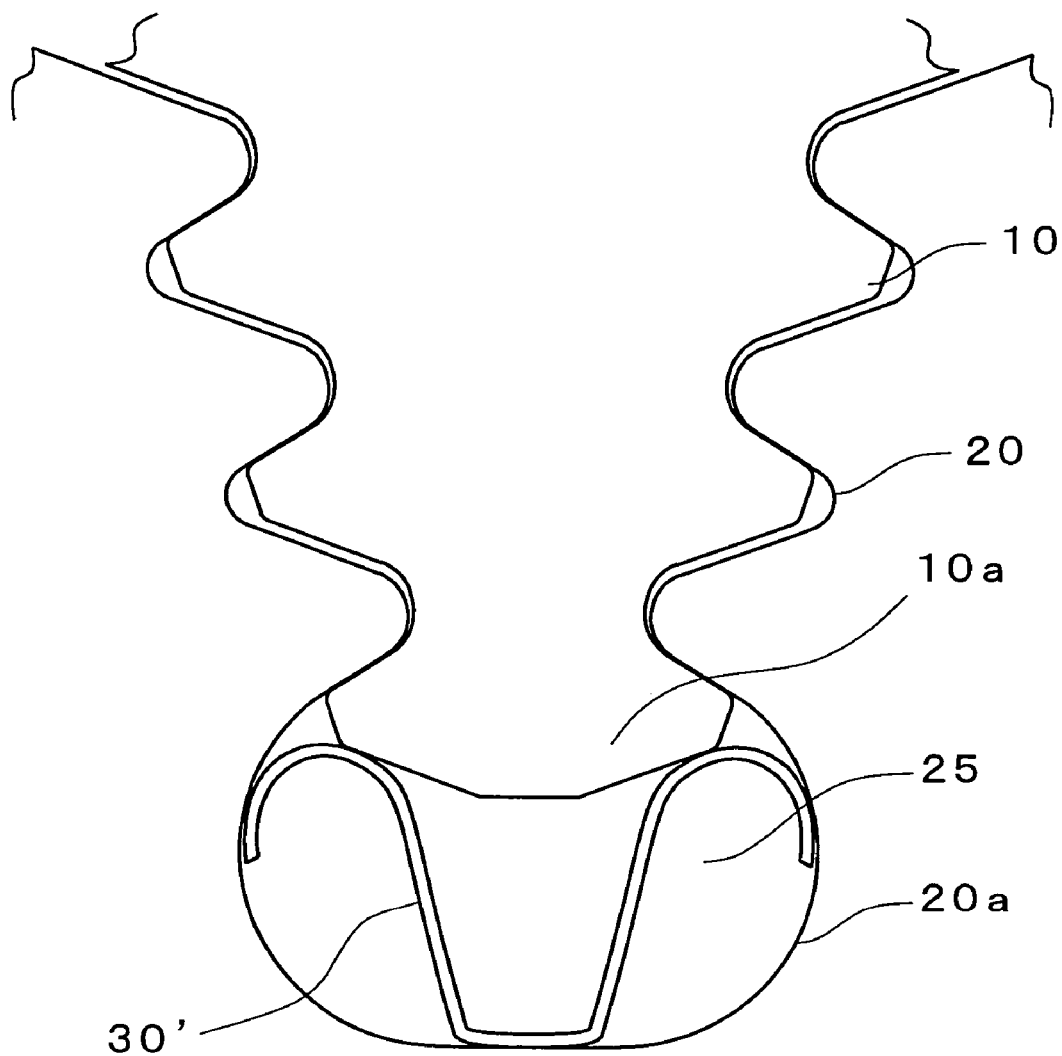
FIG. 5 is a plan view of a necessary portion of a rotating blade body viewed in a direction of a rotating shaft in accordance with a second embodiment of the present invention.
Figure 6:
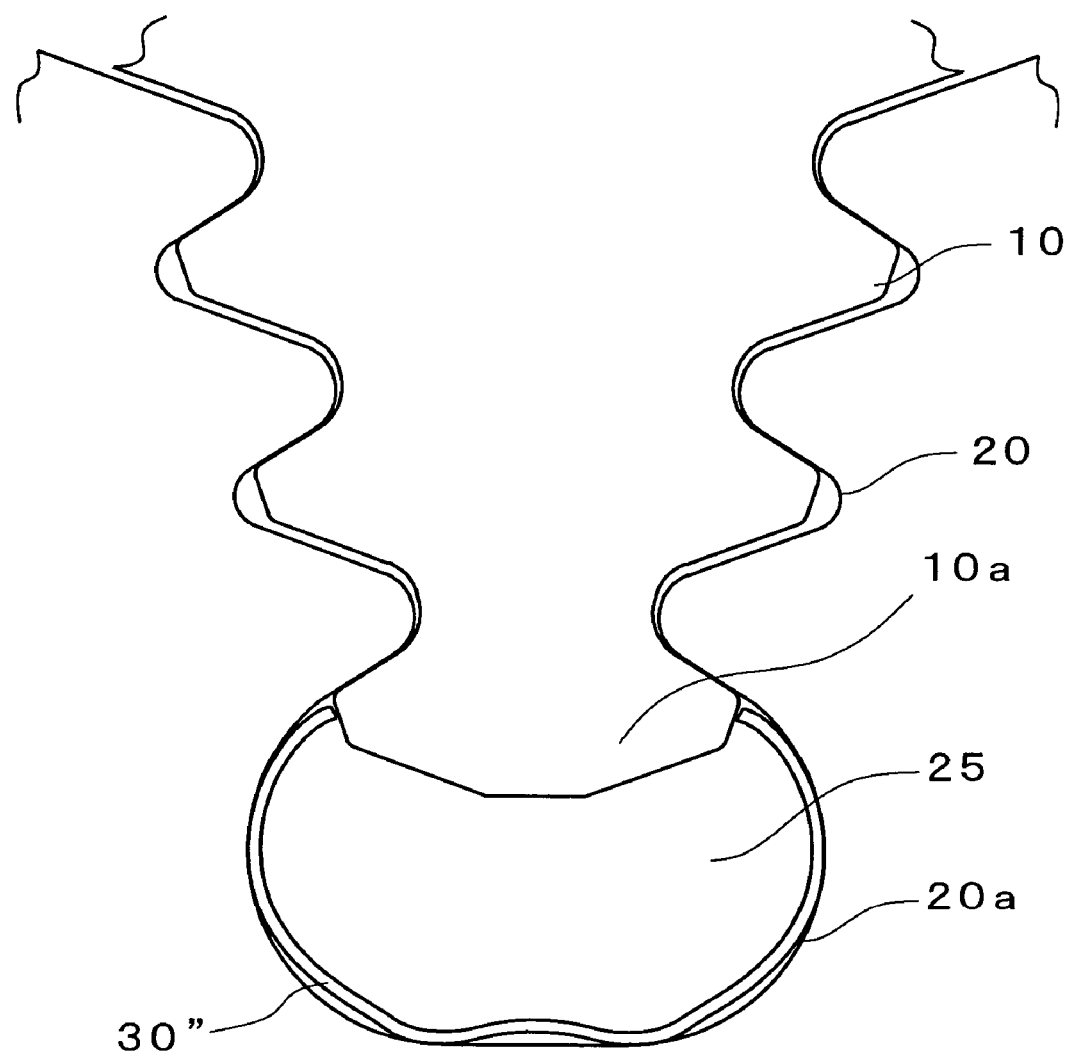
FIG. 6 is a plan view of a necessary portion of a rotating blade body viewed in a direction of a rotating shaft in accordance with a third embodiment of the present invention.

Next, a second and third embodiments of the present invention will be described, by referring to FIG. 5 and FIG. 6. FIG. 5 is a plan view of a necessary portion of a rotating blade body in accordance with a second embodiment of the present invention viewed in a direction of the rotating shaft, and FIG. 6 is a plan view of a necessary portion of a rotating blade body in accordance with a third embodiment of the present invention viewed from a direction of the rotating shaft. Characteristic of the second and third embodiments of the present invention is that leaf springs 30 serving as pushing-up members 3 in the first embodiment of the present invention are deformed. To put simply, leaf springs 30' of the second embodiment of the present invention and leaf springs 30" of the third embodiment of the present invention have no difference from the leaf springs 30 of the first embodiment of the present invention in being curved around the rotating shaft, but have a difference in curving shape thereof and condition of being in contact with the bottom-end portions 10a of blade roots 10 and the bottom portions 20a of blade grooves 20.

First, as shown in FIG. 5, the leaf springs 30' in accordance with the second embodiment of the present invention are formed so as to have both end portions thereof in a rotation direction of the rotating shaft be in contact with the side surfaces of the bottom portions 20a of blade grooves 20, get curved, rising up along the side surfaces and being in contact with the bottom-end portions 10a of blade root portions 10, and then, by getting curved further, have the middle portions come in contact with the bottom faces of the bottom portions 20a of the blade grooves 20.

On the other hand, as shown in FIG. 6, the leaf springs 30" in accordance with the third embodiment of the present invention exist approximately along the outer edges of circulation spaces 25 and are formed so as to have approximately all areas in the rotation direction of the rotating shaft be in contact with the bottom portions 20a of the blade grooves 20 and have both end portions be in contact with the side surfaces of the bottom-end portions 10a of the blade root portions 10.

Figure 7:
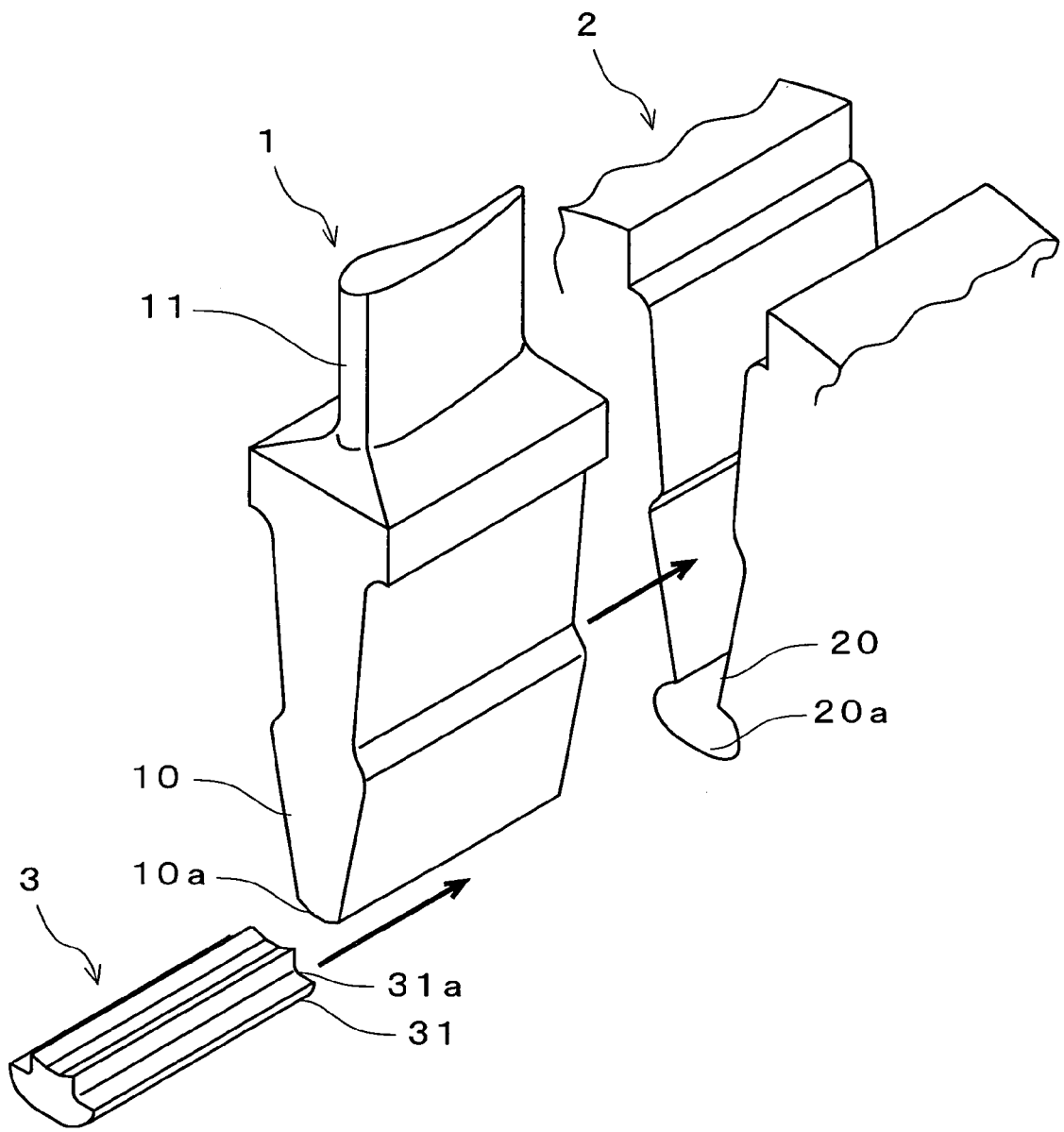
FIG. 7 is an exploded perspective view of a rotating blade body in accordance with a fourth embodiment of the present invention.
Figure 8:
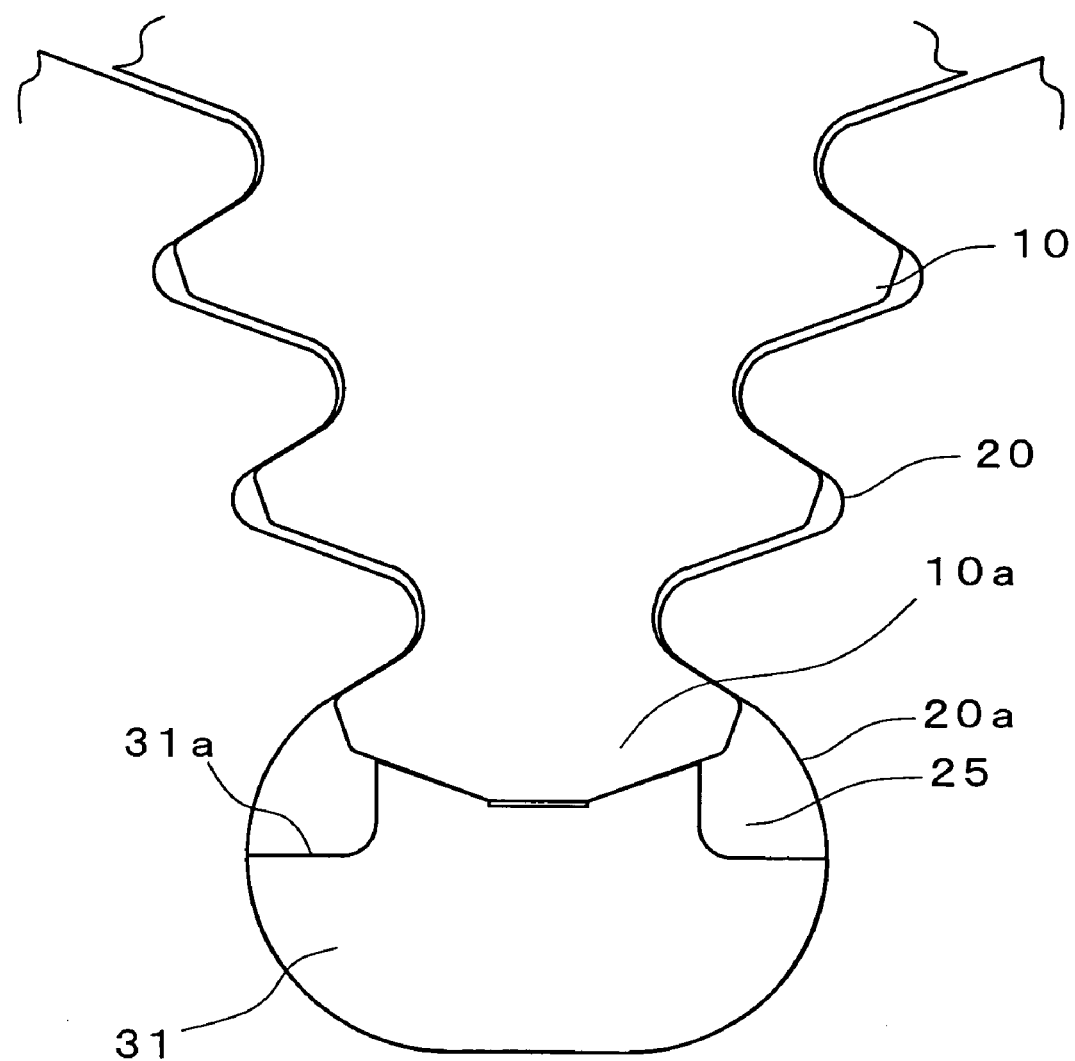
FIG. 8 is a plan view of a necessary portion of a rotating blade body viewed in a direction of a rotating shaft in accordance with a fourth embodiment of the present invention.

Next, a fourth embodiment of the present invention will be described, by referring to FIG. 7 and FIG. 8. FIG. 7 is an exploded perspective view of a rotating blade body in accordance with a fourth embodiment of the present invention, and FIG. 8 is a plan view of a necessary portion of the rotating blade body viewed in a direction of the rotating shaft. Characteristic of this fourth embodiment of the present invention is that construction of the pushing-up members 3 of the first embodiment of the present invention is deformed.

To put it plainly, in the fourth embodiment of the present invention, metallic blocks 31 are engaged into the circulation spaces 25, serving as pushing-up members 3. This block 31 has a contour approximately being along the bottom-end portion 10a of a blade root portion 10 and the bottom portion 20a of a blade groove 20. However, in the neighborhood of both side surfaces of the bottom-end portion 10a of a blade root portion 10, cutout 31a is formed along the direction of the rotating shaft.

In a rotating blade body constructed as described above, the blocks 31 serving as pushing-up members 3 function so as to serve as a kind of shim and the rotating blades 1 are pushed up outward in a radial direction against the rotor disc 2, by receiving pushing-up force from the blocks 31, thereby being fixed so as to be steadily secured at a same predetermined position as during steady-state operation when the main shaft rotates at a high speed. Therefore, because movement and inclination of the rotating blades 1 are restrained in the same manner as the above-mentioned first embodiment of the present invention, local wear and deformation of the blade grooves 20 and the blade roots 10 can be prevented and inadvertent vibration can also be restrained.

Furthermore, because the blocks 31 have cutouts 31a formed thereon although these blocks 31 exist inside the circulation spaces 25, not a little circulation of the cooling air is secured inside the circulation spaces 25, thereby maintaining cooling efficiency of a rotating blade body. Needless to say, compared with the first embodiment of the present invention, the cooling efficiency thereof is slightly inferior.

In addition, the material of blocks 31 may be selected appropriately in a same manner as the above-mentioned first embodiment of the present invention, depending on an object to which a rotating blade body is installed (a gas turbine and the like and a turbine part thereof) and on a combination of materials of the rotating blades 1 and rotor disc 2.

Figure 9:
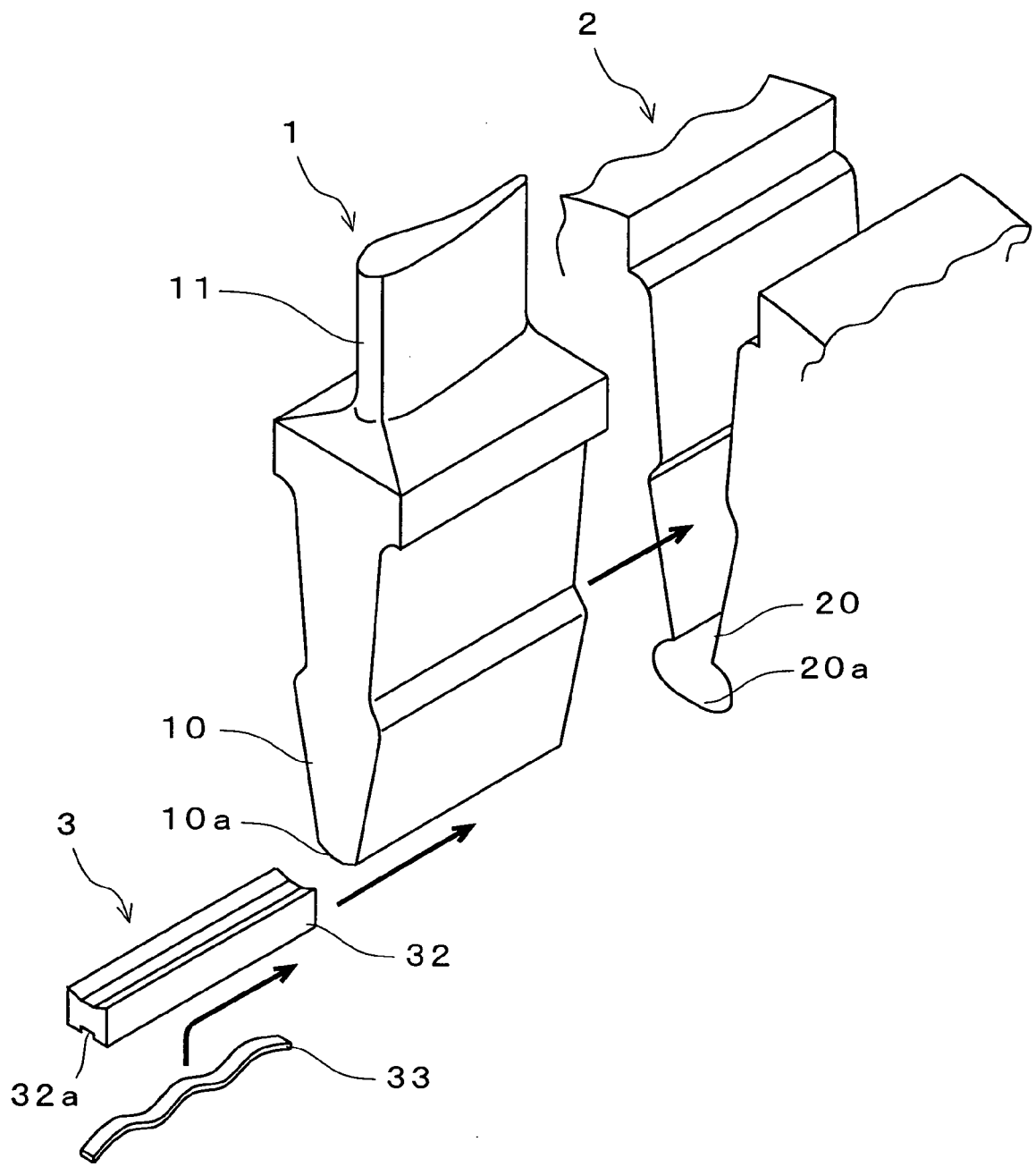
FIG. 9 is an exploded perspective view of a rotating blade body in accordance with a fifth embodiment of the present invention.
Figure 10:
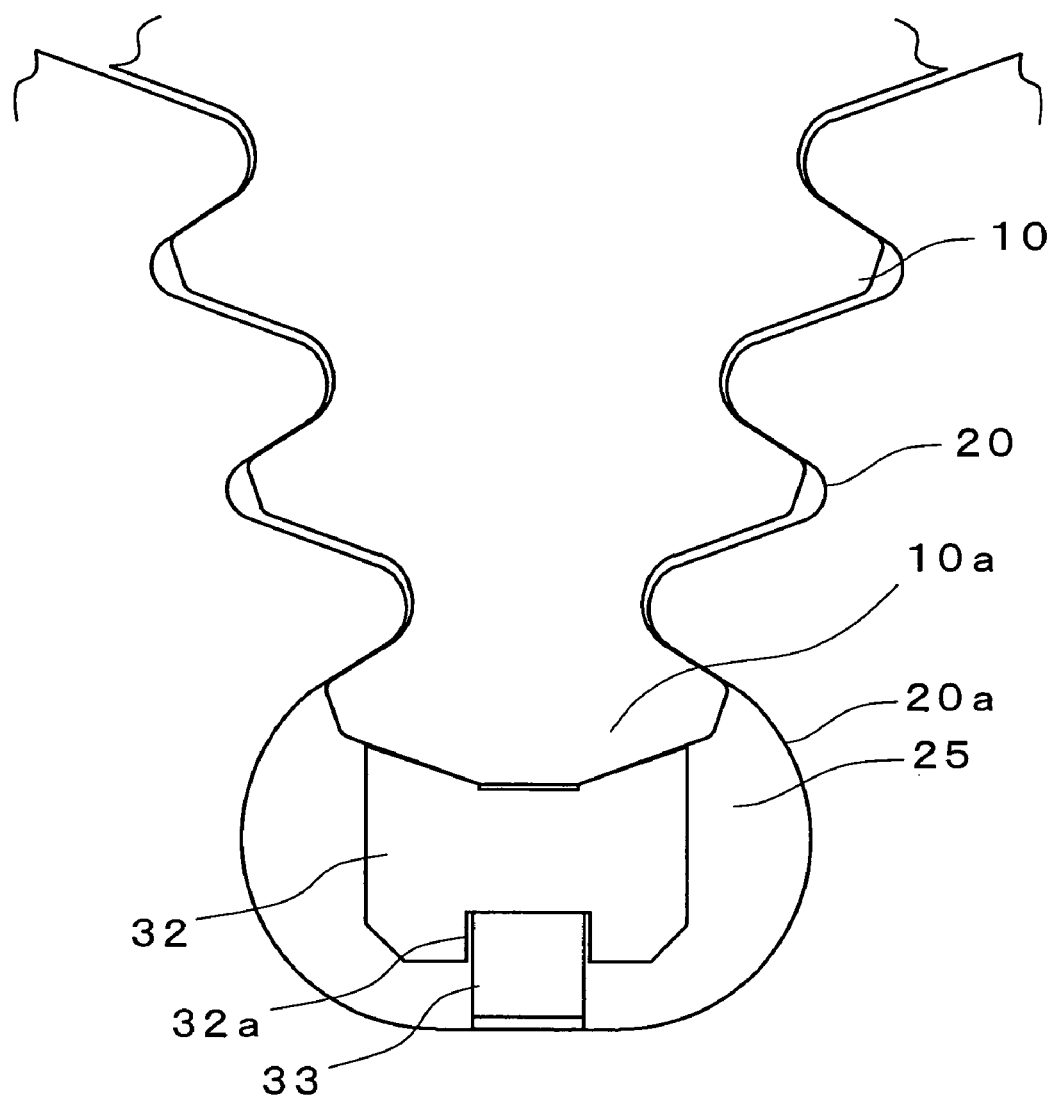
FIG. 10 is a plan view of a necessary portion of a rotating blade body viewed in a direction of a rotating shaft in accordance with a fifth embodiment of the present invention.

Next, a fifth embodiment in accordance with the present invention will be described, by referring to FIG. 9 and FIG. 10. FIG. 9 is an exploded perspective view of a rotating blade body in accordance with a fifth embodiment of the present invention, and FIG. 10 is a plan view of a necessary portion of the rotating blade body viewed in the direction of the rotation shaft. Characteristic of the fifth embodiment of the present invention is that construction of the pushing-up members 3 of the first embodiment of the present invention is deformed.

To put it simply, in the fifth embodiment in accordance with the present invention, metallic intermediate blocks 32 which are smaller than the circulation spaces 25 and have a contour formed so as to be approximately along the bottom-end portions 10a of the blade root portions 10 are inserted into the circulation spaces 25, and leaf spring pieces 33 being curved in wave pattern in a direction of the rotating shaft are engaged into the gaps between the intermediate blocks 32 and the bottom surfaces of the bottom portions 20a of blade grooves 20. A set of an intermediate block 32 and a leaf spring piece 33 comprise pushing-up members 3. Additionally, the intermediate block 32 has a notched slot 32a formed along the rotating shaft for receiving and maintaining a leaf spring piece 33.

In a rotating blade body constructed in the above-mentioned manner, rotating blades 1 receive a snapping force from leaf spring pieces 33 by way of intermediate blocks 32 as a pushing-up force and are pushed up outward in a radial direction against the rotor disc 2 in the same manner as the above-mentioned first embodiment of the present invention. By this, movement and inclination of rotating blades 1 are restrained in the same manner as the above-mentioned first embodiment of the present invention, thereby preventing local wear and deformation of the blade grooves 20 and blade root portions 10 and restraining inadvertent vibration.

Moreover, because circulation of the cooling air inside the circulation spaces 25 is secured in gaps between the bottom-end portions 10a of the blade root portions 10 and the bottom portions 20a of the blade grooves 20, and the intermediate blocks 32 and leaf spring pieces 33 although the intermediate blocks 32 and leaf spring pieces 33 exist in the circulation spaces 25, cooling efficiency of a rotating blade body can be maintained. Needless to say, compared with the first embodiment in accordance with the present invention, cooling efficiency thereof is slightly inferior.

Additionally, materials of the intermediate blocks 32 and the leaf spring pieces 33 may be selected appropriately in a same manner as the above-mentioned first embodiment of the present invention, depending on an object to which a rotating blade body is installed (a gas turbine and the like and a turbine part thereof) and on a combination of materials of rotating blades 1 and a rotor disc 2.

Figure 11:
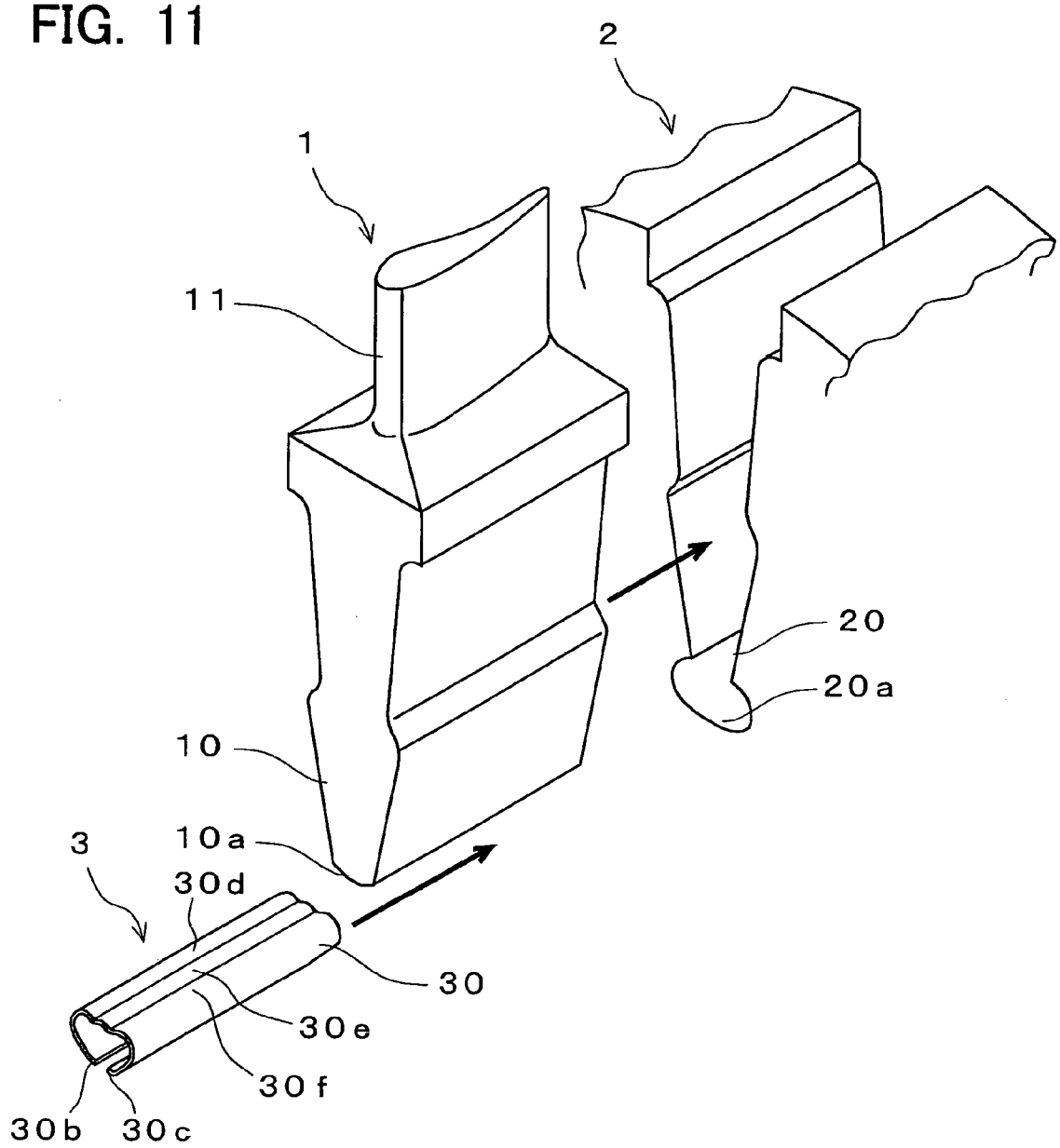
FIG. 11 is an exploded perspective view of a rotating blade body in accordance with a sixth embodiment of the present invention.
Figure 12:
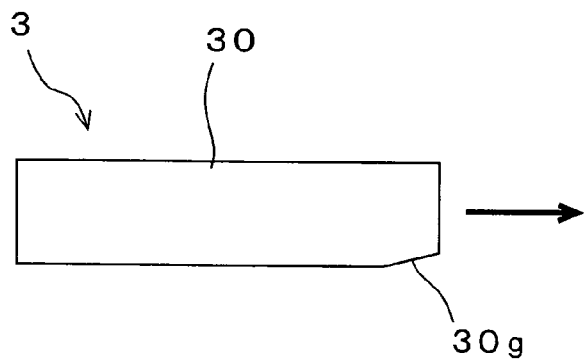
FIG. 12 is a side view of a pushing-up member in accordance with a sixth embodiment of the present invention.
Figure 13:
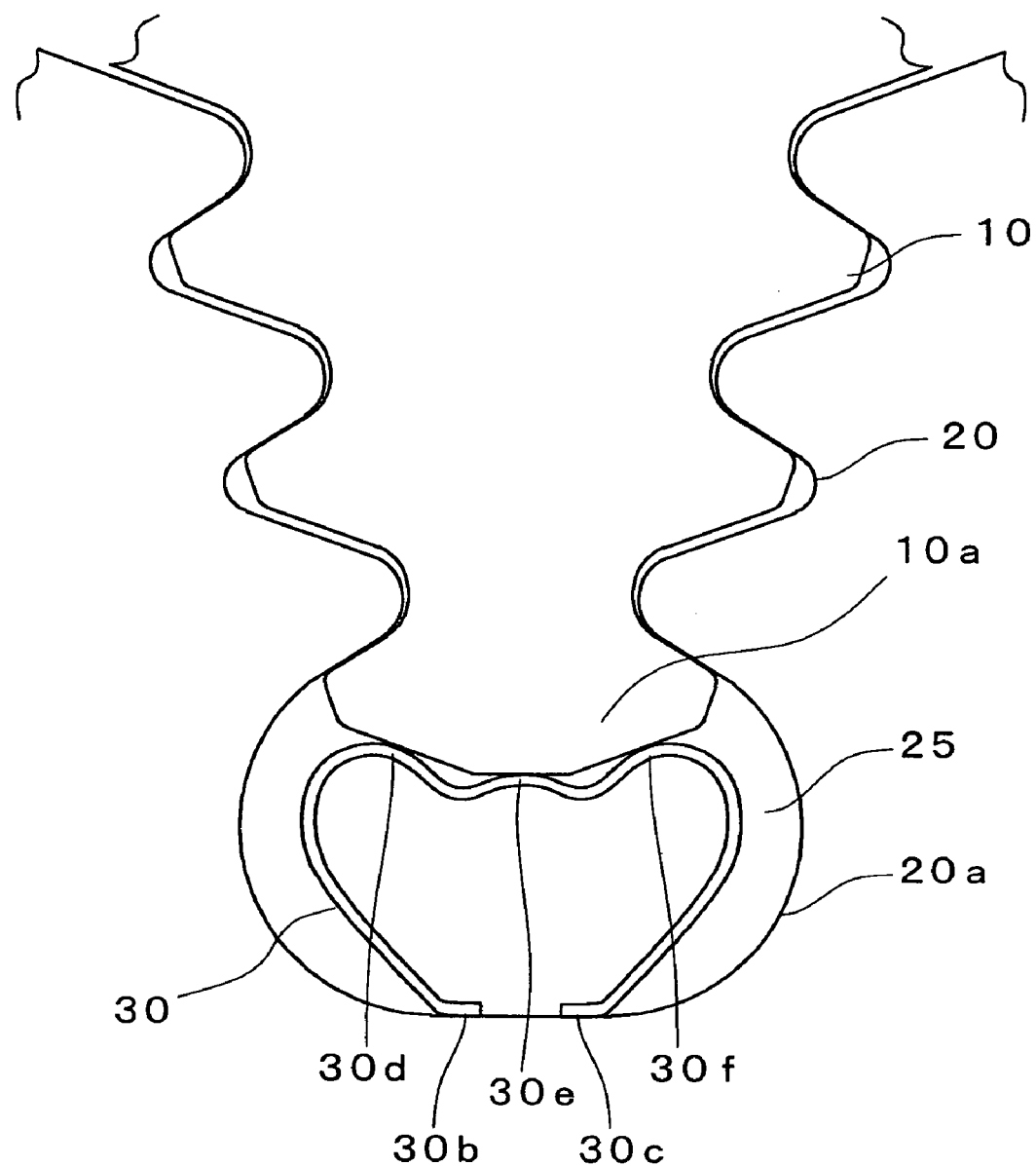
FIG. 13 is a plan view of a necessary portion of a rotating blade body viewed in a direction of a rotating shaft in accordance with a sixth embodiment of the present invention.

Next, a sixth embodiment in accordance with the present invention will be described, by referring to FIG. 11 through FIG. 13. FIG. 11 is a group of exploded perspective views of a rotating blade body in accordance with a sixth embodiment of the present invention. FIG. 12 is a side view of a pushing-up member 3 of a rotating blade body. FIG. 13 is a plan view of a necessary portion of the rotating blade body viewed in the direction of the rotating shaft. Characteristic of the sixth embodiment of the present invention is that leaf springs 30 serving as pushing-up members 3 of the first embodiment of the present invention are deformed. Namely, the leaf springs 30 of the sixth embodiment of the present invention are not different from the leaf springs 30 of the first embodiment of the present invention in being curved in the rotation direction of the rotating shaft and having both end portions thereof in a rotation direction of the rotating shaft, i.e. leg portions 30b and 30c of the leaf springs 30, in contact with the bottom surfaces of the bottom portions 20a of the blade grooves 20 of the rotor disc 2, but are different in the following points.

First, as shown in FIG. 11 and FIG. 13, a leaf spring 30 has three mountain portions 30d, 30e and 30f formed toward a bottom-end portion 10a of a blade root 10 in a middle portion of a rotation direction of the rotating shaft, and the central mountain portion 30e of these mountain portions forms a pushing-up portion by being in contact with the bottom-end portion 10a of the blade root portion 10. Secondly, as shown in FIG. 12, a leaf spring 30 has a gradually-tapering shape at a lower end 30g, which serves as a front portion in the direction of insertion when the leaf spring 30 is inserted into a circulation space 25 and which is equivalent to one end of both end portions 30b and 30c in the rotation direction of a rotating shaft. Additionally, in this embodiment in accordance with the present invention, a lower end portion of one of both end portions is shaped so as to be tapered by taper formation, but the other portions may be tapered.

In a rotating blade body in accordance with the sixth embodiment of the present invention, because lower end portions 30g of front ends of the leaf springs 30 in the direction of insertion become tapered, rotating blade 1 can be inserted into the blade grooves 20 of the rotor disc 2, and furthermore, the leaf springs 30 serving as pushing-up members 3 can be inserted into the circulation spaces 25 easily and smoothly by hitting and the direction of insertion itself can easily be determined due to tapering shape, thereby enhancing workability of installation and assembly. Moreover, in a middle portion of a leaf spring 30 in the rotation direction of the rotating shaft, the central mountain portion 30e among three mountain portions is constructed so as to be slightly lower than two mountain portions 30d and 30f on both sides at the time of assembly. As a result, when a leaf spring 30 is inserted, the bottom-end portion 10a of a blade root portion 10 can be guided by each valley portion made by the mountain portions 30d and 30f on both sides of the central mountain portion 30e so as to be positioned stably.

Additionally, by having the mountain portions 30d and 30f on both sides be in contact with the bottom-end portion 10a of blade root portion 10, stable condition can be achieved. Furthermore, the height of the leaf springs 30 can be controlled easily while manufacturing, having the central mountain portion 30e serve as a reference point.

In addition, needless to say, an above-mentioned second characteristic of the sixth embodiment in accordance with the present invention, namely tapered shape of the front end portion 30g of a leaf spring 30 in the direction of insertion into a circulation space 25, can be applied to a leaf spring 30' and 30" of the second and third embodiments in accordance with the present invention as well as to a block 31 of the fourth embodiment and to an intermediate block 32 of the fifth embodiment in accordance with the present invention.

Needless to say, a rotating blade body so constructed as described above is effective to a new rotary machine (a turbine part of a gas turbine and the like and an air compressor thereof) and can easily be applied to an existing rotary machine, simply by adding pushing-up members 3.

The present invention is not limited to each embodiment mentioned above but can be modified in various manners as far as the spirit and scope of the present invention is not deviated. For example, leaf springs 30, 30' and 30" described in the above first through third and the sixth embodiments in accordance with the present invention have no special limitation in shape thereof as long as they can supply rotating blades 1 with pushing-up force and are curved in a rotation direction of the rotating shaft.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:
1. A rotating blade body comprising:
   a rotor disc; and
   a plurality of rotating blades assembled so as to extend from an outer circumference of the rotor disc in a radial pattern,
   wherein blade root portions of the rotating blades are engaged into blade grooves which are formed along a direction of a rotating shaft on an edge of the outer circumference of the rotor disc;
   wherein circulation spaces for cooling air are formed along a direction of a rotating shaft between bottom-end portions of blade root portions of the rotating blades and bottom portions of blade grooves of the rotor disc; and into these circulation spaces are inserted and engaged pushing-up members which push up the rotating blades outward in a radial direction, maintaining circulation of the cooling air,
   wherein the pushing-up member is a leaf spring which is curved in a rotation direction of the rotating shaft,
   wherein the leaf spring includes both end portions which are in contact with the bottom surface of bottom portion of a blade groove of the rotor disc and a middle portion which is in contact with the bottom-end portion of a blade root portion of the rotating blade, and
   wherein the middle portion of the leaf spring has mountain portions formed toward the bottom-end portion of a blade root portion of the rotating blade, and the mountain portions are in contact with the bottom-end portion of a blade root of the rotating blade.

2. A rotating blade body as described in claim 1, wherein mountain portions in a middle portion of the leaf spring comprises three mountain portions.

3. A rotating blade body as described in claim 1, wherein a front end portion of the pushing-up member in a direction of insertion into the circulation space is tapered.

4. A rotary machine comprising:
   a rotating blade body as described in claim 1, stationary vanes, and
   a casing containing the rotating blade body and stationary vanes.

5. A rotating blade body as described in claim 1, wherein cutouts are formed in the leaf spring, the cutouts being formed symmetrically about the rotating shaft and in a plurality of stages along the direction of the rotating shaft.

* * * * *